United States Patent
Wang (10) Patent No.: US 8,224,042 B2
(45) Date of Patent: Jul. 17, 2012

(54) AUTOMATIC FACE RECOGNITION

(75) Inventor: Jie Wang, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 714 days.

(21) Appl. No.: 12/402,761

(22) Filed: Mar. 12, 2009

(65) Prior Publication Data

US 2010/0232657 A1 Sep. 16, 2010

(51) Int. Cl.
*G06K 9/00* (2006.01)

(52) U.S. Cl. ....................................... 382/118

(58) Field of Classification Search .................. None
See application file for complete search history.

(56) References Cited

U.S. PATENT DOCUMENTS

| | | | |
|---|---|---|---|
| 6,580,811 B2 | 6/2003 | Maurer et al. |
| 6,741,756 B1 | 5/2004 | Toyama et al. |
| 6,826,300 B2 | 11/2004 | Liu et al. |
| 7,274,822 B2 | 9/2007 | Zhang et al. |
| 7,369,686 B2 | 5/2008 | Yokono et al. |
| 7,372,981 B2 | 5/2008 | Lai et al. |
| 2006/0251339 A1 | 11/2006 | Gokturk et al. |
| 2008/0144941 A1 | 6/2008 | Togashi |

FOREIGN PATENT DOCUMENTS

EP  1426898 A2  6/2004

OTHER PUBLICATIONS

A SVM Face Recognition Method Based on Gabor-Featured Key Points, Jun Qin and Zhong-Shi He, College of Computer Science, Chongqing University, Chongqing, 400044, P.R. China, Proceedings of the Fourth International Conference on Machine Learning and Cybernetics, GuangZhou, Aug. 18-21, 2005, vol. 8, (pp. 5144-5149).
Learning Bayesian Network Classifiers for Facial Expression Recognition using both Labeled and Unlabeled Data, IRA Cohen, Nicu Sebe, Fabio G. Cozman, Marcelo C. Cirelo and Thomas S. Huang, Geckman Institute, University of Illinois at Urbana-Champaign, IL, USA, Leiden Institute of Advanced Computer Science, Leiden University, The Netherlands, Escola Politecnica, Universidade de Sao Paulo, Sao Paulo, Brazil, Computer Vision and Pattern Recognition, 2003, Proceedings, 2003 IEEE Computer Society Conference on vol. 1, Issue, 18-20 June.

(Continued)

*Primary Examiner* — Brian P Werner
*Assistant Examiner* — Elisa Rice
(74) *Attorney, Agent, or Firm* — Mark P. Watson (57) ABSTRACT

Automatic face recognition. In a first example embodiment, a method for automatic face recognition includes several acts. First, a face pattern and two eye patterns are detected. Then, the face pattern is normalized. Next, the normalized face pattern is transformed into a normalized face feature vector of Gabor feature representations. Then, a difference image vector is calculated. Next, the difference image vector is projected to a lower-dimensional intra-subject subspace extracted from a pre-collected training face database. Then, a square function is applied to each component of the projection. Next, a weighted summation of the squared projection is calculated. Then, the previous four acts are repeated for each normalized gallery image feature vector. Finally, the face pattern in the probe digital image is classified as belonging to the gallery image with the highest calculated weighted summation where the highest calculated weighted summation is above a predefined threshold.

20 Claims, 8 Drawing Sheets

OTHER PUBLICATIONS

Bayesian Face Recognition with Deformable Image Models, Baback Moghaddam, Chahab Nastar and Alex Pentland, Mitsubishi Electric Research Laboratory, Cambridge, MA 02139, Inria Rocquencourt, B.P. 105, F-78153 Le Chesnay Cedex, France, MIT Media Laboratory, 20 Ames, St., Cambridge, MA 02139, Image Analysis and Processing, 2001 Proceedings, 11th International Conference on Sep. 26-28, 2001, (pp. 26-35).

Independent Component Analysis of Gabor Features for Face Recognition, Chengjun Liu and Harry Wechsler, IEEE Trans. Neural Networks, vol. 14, No. 4, Jul. 2003, (pp. 1-40).

AUTOMATIC FACE RECOGNITION

BACKGROUND

1. Technical Field

Embodiments of present invention relate to automatic face recognition. In particular, example embodiments of the present invention relate to methods for automatic face recognition that employ appearance-based techniques.

2. Related Art

Face recognition systems generally include a database, known as a gallery, consisting of facial images from a set of known subjects of interest. The objective of a face recognition system is to determine the identity of an unknown input facial image, known as a probe. In other words, the task of a face recognition system is to determine the gallery subject to which the probe image belongs.

Among various face recognition methodologies, appearance-based approaches, which treat the two-dimensional facial images as a holistic pattern, are among the most promising solutions and have dominated the face recognition literature in the recent decade. In appearance-based approaches, each face pattern is represented by a column vector consisting of pixel intensity values in the image. Face recognition is therefore viewed as a multivariate statistical pattern recognition problem.

A major challenge to this approach is the high dimensionality of the sample space combined with a limited number of face samples available for training, also known as the "small sample size" problem. The small sample size problem makes many learning algorithms mathematically intractable or empirically unstable. In particular, if only one image sample per subject is available, which is a commonly encountered situation in realistic application scenarios, the small sample size problem becomes even more challenging.

SUMMARY

In general, example embodiments relate to methods for automatic face recognition that employ appearance-based techniques. Some example embodiments only require a single image to be registered for each subject and combine the strengths of a Gabor method, Bayesian learning, and support vector machine (SVM)-based classification.

In a first example embodiment, a method for automatic face recognition includes several acts. First, a face pattern is detected in a probe digital image. Next, two eye patterns are detected in the face pattern. Then, the face pattern is normalized by rotating and resizing the face pattern to place centers of the two eye patterns on predetermined pixels. Next, the normalized face pattern is transformed into a normalized face feature vector of Gabor feature representations. Then, a difference image vector is calculated using the normalized face feature vector and a normalized gallery image feature vector of a gallery image in a gallery of images. Next, the difference image vector is projected to a lower-dimensional intra-subject subspace extracted from a pre-collected training face database. Then, a square function is applied to each component of the projection. Next, a weighted summation of the squared projection is calculated. Then, the previous four acts are repeated for each normalized gallery image feature vector in the gallery of images. Finally, the face pattern in the probe digital image is classified as belonging to the gallery image with the highest calculated weighted summation where the highest calculated weighted summation is above a predefined threshold.

In a second example embodiment, a method for automatic face recognition includes several acts. First, a normal to a separation hyperplane $\hat{w}=[\hat{w}_1, \ldots, \hat{w}_T]$ is obtained through SVM training. Next, G gallery images are normalized and transformed into corresponding Gabor feature vectors, denoted as $g_i$, $i=1, \ldots, G$. Then, a probe image is normalized and transformed into a corresponding Gabor feature vector, denoted as p. Next, an image difference vector $\delta$, denoted as $\delta = p - g_i$, is calculated. Then, the image difference vector $\delta$ is projected to intra-subject space $A^T$, thereby obtaining a projection $\hat{\delta}=A^T\delta$. Next, a square function is applied to the projection $\hat{\delta}$ to obtain $\tilde{\delta}$. Then, M components of $\tilde{\delta}$ are firstly partitioned into T groups sequentially with each group containing L components with $\tilde{\delta}=[[\tilde{\delta}_1, \ldots, \tilde{\delta}_L],[\tilde{\delta}_{L+1}, \ldots, \tilde{\delta}_{2L}], \ldots, [\tilde{\delta}_{(T-1)L+1}, \ldots, \tilde{\delta}_{TL}]]^T$. Next, a weighted summation $S_i$ is calculated according to the following equation:

$$S = \sum_{j=1}^{M} w_j \tilde{\delta}_j$$

$$= \sum_{m=1}^{T} \sum_{n=1}^{L} \hat{w}_m \tilde{\delta}_{(m-1)L+n}$$

$$= \sum_{m=1}^{T} \hat{w}_m \left( \sum_{n=1}^{L} \tilde{\delta}_{(m-1)L+n} \right)$$

$$= \sum_{m=1}^{T} \hat{w}_m s_m$$

$$= \hat{w}^T s.$$

Then, for each $g_i$, the previous four acts are repeated. Finally, it is determined that the probe image belongs to the gallery subject associated with the highest $S_i$ value where the highest $S_i$ value is above a predefined threshold.

In a third example embodiment, one or more computer-readable media have computer-readable instructions thereon which, when executed, implement the method for automatic face recognition discussed above in connection with the first example embodiment.

In a fourth example embodiment, an image processing apparatus includes an electronic display, a processor in electronic communication with the electronic display, and one or more computer-readable media in electronic communication with the processor. The one or more computer-readable media have computer-readable instructions thereon which, when executed by the processor, cause the processor to perform the acts of the method for automatic face recognition discussed above in connection with the first example embodiment, as well as perform the act of sending data corresponding to the gallery image to which the probe digital image belongs to the electronic display for display thereon.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further develop the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention. Example embodiments of the invention will be disclosed and explained with additional specificity and detail through the use of the accompanying drawings in which.

DETAILED DESCRIPTION OF SOME EXAMPLE EMBODIMENTS

In the following detailed description of the embodiments, reference is made to the accompanying drawings that show, by way of illustration, specific embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to systems and methods for automatic face recognition that employ appearance-based techniques. Example embodiments can be used to automatically determine the gallery subject to which a probe image belongs. Unlike prior art systems and methods that employ a linear discriminant analysis (LDA)-based method, example embodiments disclosed herein utilize a Bayesian learning technique in "one sample" scenarios with the systems and methods employing training on subjects different from those to be identified. In addition, instead of using traditional maximum likelihood or maximum a posteriori classification rules, example embodiments disclosed herein employ a more sophisticated SVM-based classifier applied on a regularized feature representation to further improve recognition performance.

I. Example Environment

The example methods and variations thereof disclosed herein can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing apparatuses such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners (examples of which include, but are not limited to, the Epson Perfection© V200, V300, V500, V700, 4490, and V750-M Pro, the Epson Expression© 10000XL, and the Epson GT-1500, GT-2500, GT-15000, GT-20000, and GT-30000, all manufactured by Seiko Epson Corporation), copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation) or a digital camera/camcorder combination. An image processing apparatus may include automatic face recognition capability, for example, to automatically determine the gallery subject to which a probe image belongs. For example, a portable photo viewer with this automatic face recognition capability may include one or more computer-readable media that implement the example methods disclosed herein, or a computer connected to the portable photo viewer may include one or more computer-readable media that implement the example methods disclosed herein.

Figure 1:
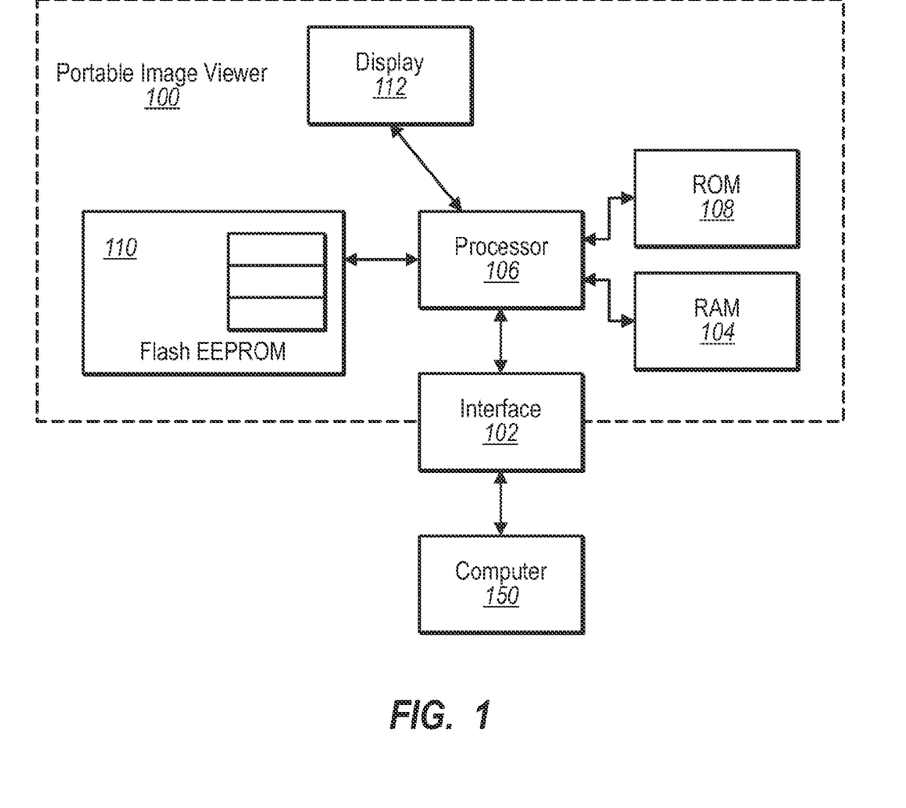
FIG. 1 is a schematic representation of an example portable photo viewer.

While any imaging apparatus could be used, for purposes of illustration an example embodiment will be described in connection with an example portable photo viewer, a schematic representation of which is denoted at 100 in FIG. 1. The example portable photo viewer 100 exchanges data with a host computer 150 by way of an intervening interface 102. Application programs and a portable photo viewer driver may also be stored for access on the host computer 150. When an image retrieve command is received from the application program, for example, the portable photo viewer driver controls conversion of the command data to a format suitable for the portable photo viewer 100 and sends the converted command data to the portable photo viewer 100. The driver also receives and interprets various signals and data from the portable photo viewer 100, and provides necessary information to the user by way of the host computer 150.

When data is sent by the host computer 150, the interface 102 receives the data and stores it in a receive buffer forming part of a RAM 104. The RAM 104 can be divided into a number of sections, through addressing for example, and allocated as different buffers, such as a receive buffer or a send buffer. For example, digital photographic image data can be sent to the portable photo viewer 100 from the host computer 150. This digital photographic image data can then be stored in the receive buffer or the send buffer of the RAM 104.

A processor 106 uses computer-executable instructions stored on a ROM 108 or on a flash EEPROM 110, for example, to perform a certain function or grou of functions, such as the example methods for automatic face recognition disclosed herein. Where the data in the receive buffer of the RAM 104 is two or more digital photographic images, for example, the processor 106 can implement the methodological acts on the digital photographic images of the example methods for automatic face recognition disclosed herein to automatically determine the gallery subject to which a probe image belongs. Data corresponding to the gallery image to which the probe digital image belongs can then be sent by the portable photo viewer 100 to the display 112 for display thereon or transferred to the host computer 150, for example. Data corresponding to the gallery image to which the probe digital image belongs can be identification information of the person depicted in the gallery images such as name, birth date, and/or contact information, for example. This data can also/alternatively include information about the gallery image such as image file name, file size, image resolution, and/or the date that the image was captured as a digital photograph, for example. The processor 106 is in electronic communication with the display 112, which can be any type of an electronic display including, but not limited to a visual display, an auditory display, or a tactile display. For example, the display 112 can be an electronic visual display such as a liquid crystal display (LCD).

It is understood that digital photographic images may be received by the portable photo viewer 100 from sources other than the computer 150, including, but not limited to, the flash EEPROM 110 or the ROM 108. Example embodiments of the portable photo viewer 100 include, but are not limited to, the portable photo viewer models disclosed herein.

II. Example Method

Figure 2:
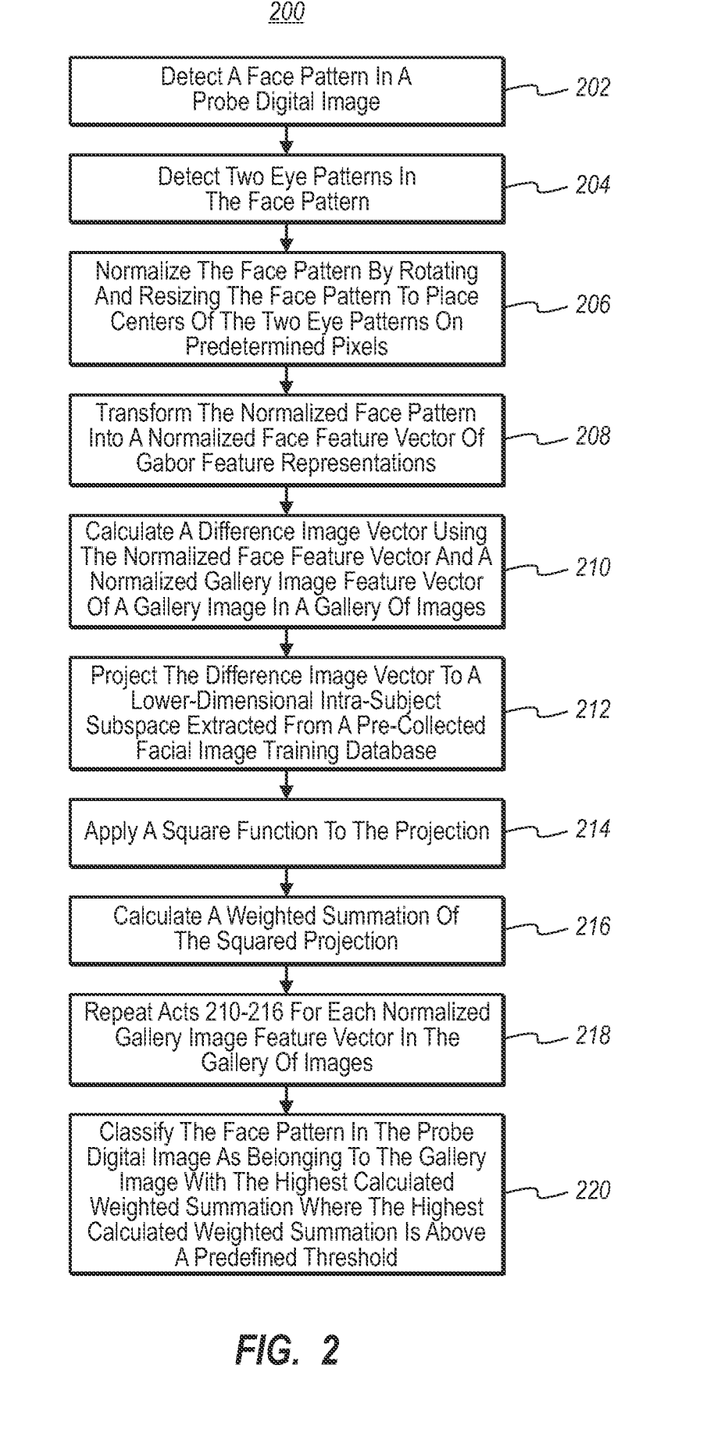
FIG. 2 is a flowchart of an example method for automatic face recognition.
Figure 3:
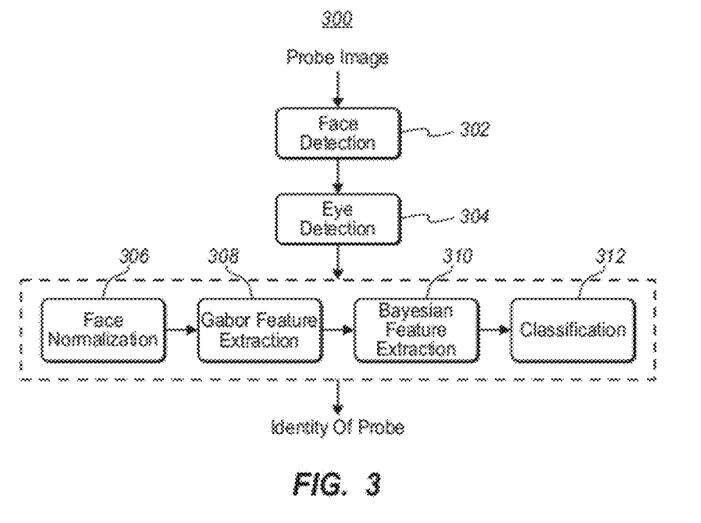
FIG. 3 is a flowchart of an example implementation of the example method of FIG. 2.

FIG. 2 is a flowchart of an example method 200 for automatic face recognition. The example method 200 for automatic face recognition will now be discussed in connection with FIG. 2. Prior to performing the method 200, a probe image is targeted for face recognition by comparison with a gallery of images.

First, at 202, a face pattern is detected in a probe digital image. Next, at 204, two eye patterns are detected in the detected face pattern. Then, at 206, the detected face pattern is normalized by rotating and resizing the face pattern to place centers of the two eye patterns on predetermined pixels. Next, at 208, the normalized face pattern is transformed into a normalized face feature vector of Gabor feature representations. Then, at 210, a difference image vector is calculated using the normalized face feature vector and a normalized gallery image feature vector of a gallery image in a gallery of images. Next, at 212, the difference image vector is projected to a lower-dimensional intra-subject subspace extracted from a pre-collected facial image training database. Then, at 214, a square function is applied to each component of the projection. Next, at 216, the weighted summation of the squared projection is calculated. Then, at act 218, acts 210-216 are repeated for each normalized gallery image feature vector in the gallery of images. Finally, at act 220, the detected face pattern in the probe digital image is classified as belonging to the gallery image with the highest calculated weighted summation where the highest calculated weighted summation is above a predefined threshold.

III. Example Implementation of the Example Method

An example implementation of the example method 200 of FIG. 2 will now be disclosed in connection with FIGS. 3-8. As disclosed in FIG. 3, the example implementation 300 includes the following processes: face detection 302, eye detection 304, face normalization 306, Gabor feature extraction 308, Bayesian feature extraction 310, and classification 312. Each of these processes will now be discussed in turn.

Figure 4:
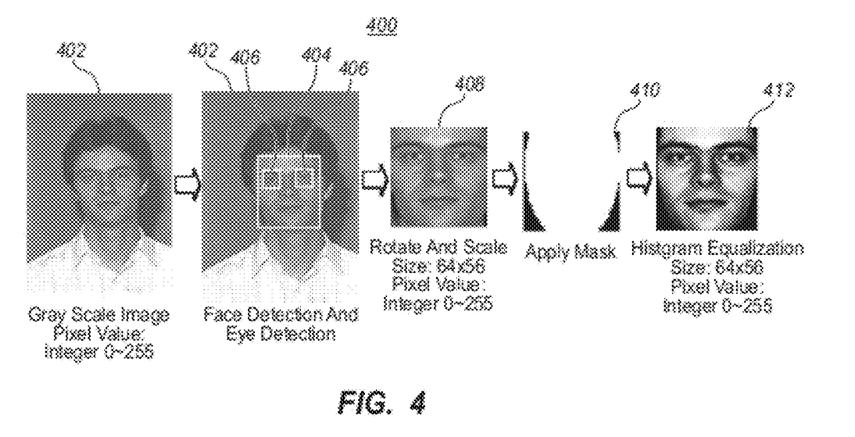
FIG. 4 is a flowchart of the face normalization process of the example implementation of FIG. 3.

With reference now to FIG. 4, an example face normalization process 400 is disclosed. At 202, a face pattern 404 is detected in a probe digital image 402. Where the probe digital image 402 is a full color image, the probe digital image 402 may also be transformed to gray-scale by, for example, removing all but the luminance component in YCbCr color space. Other color to gray-scale transformation operators can also alternatively be applied such as averaging the red, green and blue channel values as (R+G+B)/3. Then, at 204, two eye patterns 406 are detected in the detected face pattern 404. Next, in order to deal with faces with different sizes and different in-plane rotations, at 206, the detected face pattern 404 is normalized by rotating and resizing the face pattern 404 to place centers of the two eye patterns 406 on predetermined pixels, resulting in the rotated and scaled face pattern 408. For example, at 206, the face pattern 404 may be rotated and scaled so that the centers of the detected eye patterns 406 are placed on specific pixels and the image size is normalized to a specific size, such as 64 pixels by 56 pixels for example. In addition, the normalization at 206 may further include applying a mask 410 to the detected face pattern 408 to remove non-face portions. The normalization at 206 may also include performing histogram equalization on the masked detected face pattern, resulting in the face pattern 412.

It is noted that the normalization at act 206 of the detected face pattern 404 transforms electronic data that represents a physical and tangible object. In particular, in the illustrated example the electronic data represents a human face. During act 206 the data is transformed from a first state into a second state. In the first state, the data represents the human face in a first pose, an example of which is disclosed in the detected face pattern 404 in which the face is tipped slightly down to the left. In the second state, the data represents the human face in a second pose, an example of which is disclosed in the rotated and scaled face pattern 408 in which the face is substantially level without being tipped down on either side. Similarly, the application of the mask 410 to the detected face pattern 408 to remove non-face portions, and the performance of histogram equalization on the masked detected face pattern, are each steps that transform data that represents a physical and tangible object, namely a human face.

Figure 5:
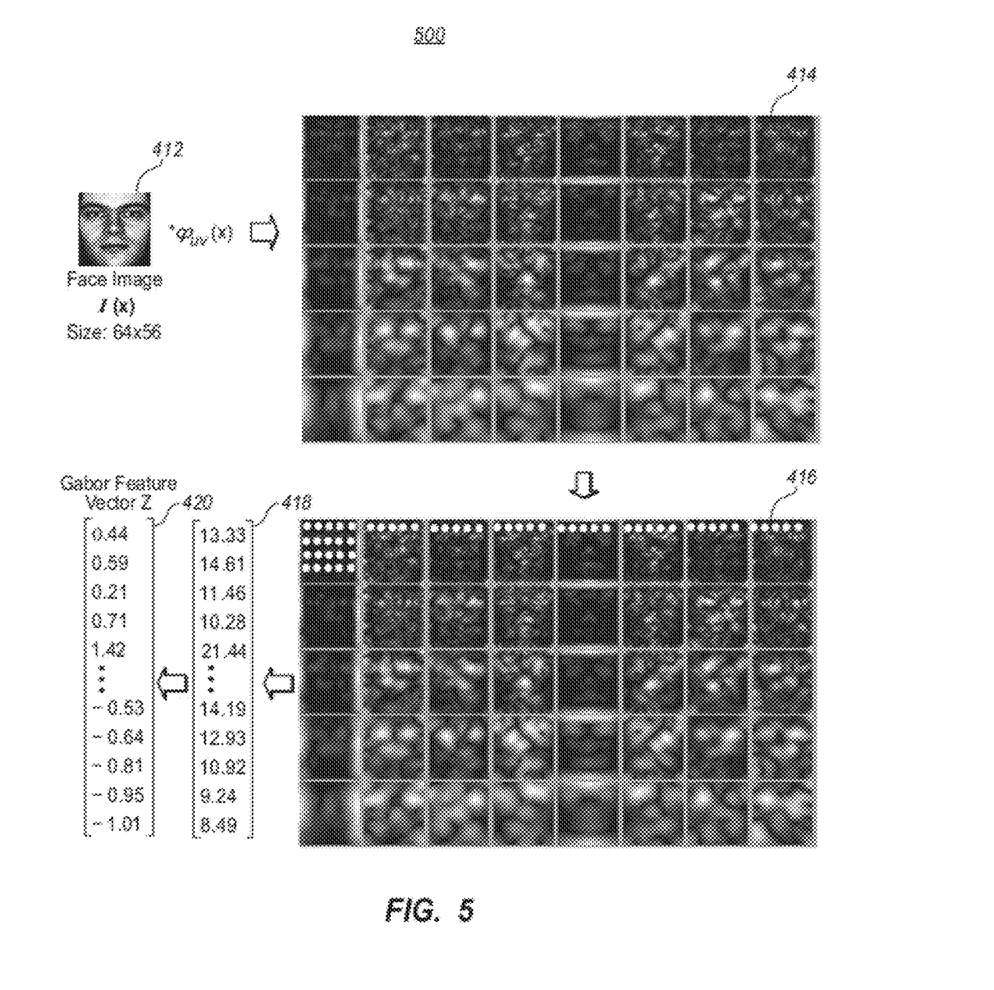
FIG. 5 is a depiction of the Gabor feature extraction process of the example implementation of FIG. 3.
Figure 6:
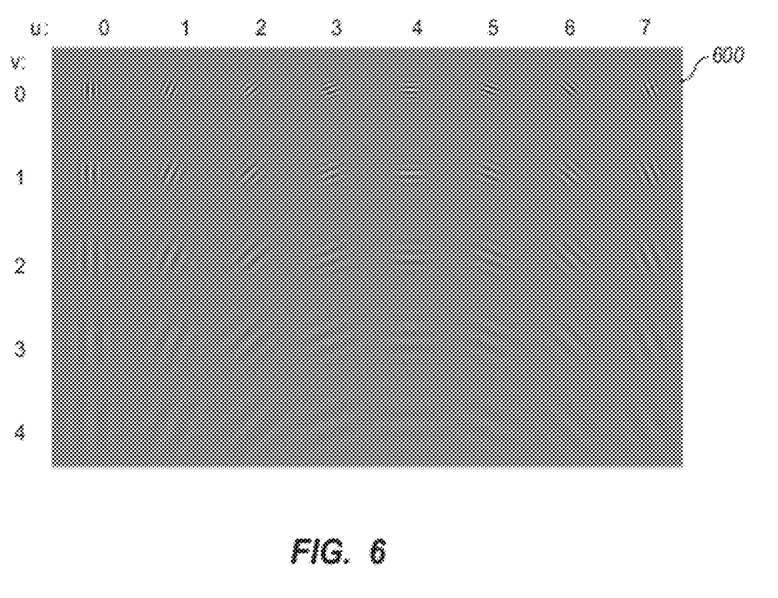
FIG. 6 is an illustration of the real part of a Gabor wavelet filter.

With reference now to FIG. 5, an example Gabor feature extraction process 500 is disclosed. At 208, the normalized face pattern 412 is transformed into a normalized face feature vector of Gabor feature representations. To obtain Gabor feature representations, the normalized face pattern 412 is convolved with a Gabor wavelet filter $\phi_{u,v}$ defined as follows:

$$\varphi_{u,v}(x) = \frac{\|k_{uv}\|^2}{\omega^2} \exp\left(\frac{-\|k_{uv}\|^2 \|x\|^2}{2\omega^2}\right)\left[\exp(ik_{uv}x) - \exp\left(-\frac{\omega^2}{2}\right)\right] \quad (1)$$

where x=[x,y] denotes the x- and y-coordinates of the normalized face pattern 412, u, v define the orientations and scales of the Gabor wavelet kernel, $\omega$ is a sigma of a Gaussian envelope, $\|.\|$ denotes the norm operator, and $k_{uv}$ is defined as:

$$k_{uv} = \frac{k_{max}}{f} \exp\left(\frac{i\pi u}{8}\right) \quad (2)$$

where $k_{max}$ is the maximum frequency and f is the spacing factor between kernels in the frequency domain. In the example implementation 300, the values of $\phi_{u,v}(x)$ are floating numbers from −1 to 1 with both real and imaginary parts, with u={0,1,...7} and v={0,1,...4}. FIG. 6 is an illustration 600 of the real part of $\phi_{u,v}(x)$, u={0,1,...7}, v={0,1...4}.

Where I(x) denotes the normalized face pattern 412, the corresponding Gabor feature representation of I(x), denoted as $G_{uv}(x)$, can be obtained as follows:

$$G_{uv}(x) = (I*\phi_{uv})(x) \quad (3)$$

where * denotes the convolution operator.

In some example embodiments of the method 200, parameter values are set as follows: $k_{max}=\pi/2$, $f=\sqrt{2}$, $\omega=2\pi$, u={0,...,7} and v={0,...,4}. Therefore, each face pattern, of size 64 pixels by 56 pixels for example, is represented by a set of Gabor wavelet coefficients $G_{uv}(x)$. $G_{uv}(x)$ is a complex value and the magnitude of $G_{uv}(x)$ 414 is used to represent faces, denoted as $|G_{uv}(x)|$. The magnitude of $G_{uv}(x)$ 414 may have a size of (64×5)×(56×8) for example.

It is noted that transformation at act 208 of the face pattern 412 transforms electronic data that represents a physical and tangible object. In particular, this electronic data represents a human face. During act 208 this data is transformed from a first state into a second state. In the first state, the data represents the human face shown at 412 in FIG. 5. In the second state, the data represents the human face divided into a set of Gabor wavelet coefficients $G_{uv}(x)$, an example of the magnitude of $G_{uv}(x)$ being shown at 414.

The Gabor feature vector is then formed by lexicographic ordering of the Gabor wavelet coefficients, resulting in a vector of length 143,360(=64×56×8×5). It can be seen that the dimensionality of the Gabor feature space is extremely high which makes further computation a difficult task. Therefore, each $|G_{uv}(x)|$ 414 may first be down sampled by a factor of 4×4 to a down-sampled version 416, resulting in a Gabor vector 418 of length 8960 (=143,360/16), denoted as $z \in R^J$, where $R^J$ denotes the J-dimensional real space (with J=8960 in the example implementation 300). The Gabor vector may further be normalized to zero mean and unit variance, resulting in a normalized Gabor vector 420 of length 8960.

After Gabor feature extraction, each face pattern is represented as a column vector, having a length J=8960 in the example implementation 300. Thus face recognition can be viewed as a statistical pattern recognition problem in high dimensional space. A direct classification in such high dimensional space is difficult or sometimes intractable due to the so-called "curse of dimensionality" problem. Therefore, a statistical feature extraction (dimensionality reduction) procedure is followed in the example embodiments disclosed herein to project the original high dimensional space to a much lower subspace in which face samples are expected to be well clustered and separated.

In the example implementation 300, at 212, a Bayesian framework is employed to project the original Gabor feature space to a lower-dimensional space, denoted as intra-subject subspace. The Bayesian solution will now be reviewed followed by a detailed derivation of how to extract intra-subject subspace.

The Bayesian solution treats face recognition as a binary pattern classification problem. It classifies the difference between two images to either an intra-subject variation class $\omega_I$ or an inter-subject variation class $\omega_E$. In Bayesian learning framework, at 210, the difference of pair face images are calculated. Each pair of difference images is labeled as either an intra-subject class ($\Delta_I$) indicating that the difference image is calculated between images from the same subject or an intra-subject class ($\Delta_E$) indicating that the difference image is calculated between images from different subjects. Two feature subspaces, denoted as intra-subject space and inter-subject space, are then extracted by performing principal component analysis (PCA) on $\Delta_I$ and $\Delta_E$ respectively. In the reduced PCA subspace, the class conditional distributions of two classes $p(\Delta|\omega_I)$ and $p(\Delta|\omega_E)$ are estimated using Gaussian model. Thus, to determine if two facial images belong to the same individual, their image difference $\Delta$ is firstly calculated. The determination is then made according to the maximum a posteriori (MAP) or maximum-likelihood (ML) classification rule.

In the example implementation 300, in order to balance the recognition accuracy and computational cost, only intra-subject subspace is extracted. In addition, instead of using a standard MAP or ML classification rule, a more sophisticated SVM based classifier is applied to perform the classification of $\omega_I$ and $\omega_E$.

To extract intra-subject subspace, a training database is first collected. Let $\Delta_I=\{\delta_1,...,\delta_N\}$ be an image difference set consisting of image difference vectors from the same subject, with $\delta_i=(z_m-z_n)_{ID(z_m)=ID(z_n)}$, where $z_m,z_n \in R^J$ denote two face images represented by two J-dimensional Gabor vectors, and ID(z) denotes the ID label of z. PCA is then applied on $\Delta_I$ to extract the intra-subject subspace, with $\hat{\delta}=A^T\delta$, where $\delta \in R^J$ is an image difference vector, $\hat{\delta} \in R^M$ is the corresponding feature representation in the extracted intra-subject subspace and A is a J×M(M<<J) transformation matrix, which is obtained by solving an eigenvalue problem of the covariance matrix S estimated on $\Delta_I$ according to the following equation:

$$S = \frac{1}{N}\sum_{i=1}^{N}(\delta_i - \bar{\delta})(\delta_i - \bar{\delta})^T \quad (4)$$

$$\bar{\delta} = \frac{1}{N}\sum_{i=1}^{N}\delta_i$$

where $\Lambda=[\lambda_1,...,\lambda_M], \lambda_1 \geq,...,\geq \lambda_M$ are the M largest eigenvalues of S and $V=[v_1,...,v_M]$ are the corresponding M eigenvectors, and the intra-subject space is thus spanned by $[v_1,...,v_M]$, i.e., $A=[v_1,...,v_M]$. In the example implementation 300, an example of transformation matrix of size 500× 8960 is as follows:

$$A = \begin{bmatrix} -0.015 & -0.017 & -0.018 & \dots \\ -0.013 & -0.012 & -0.007 & \dots \\ 0.012 & 0.022 & 0.025 & \dots \\ \vdots & \vdots & \vdots & \ddots \end{bmatrix}$$

Figure 7:
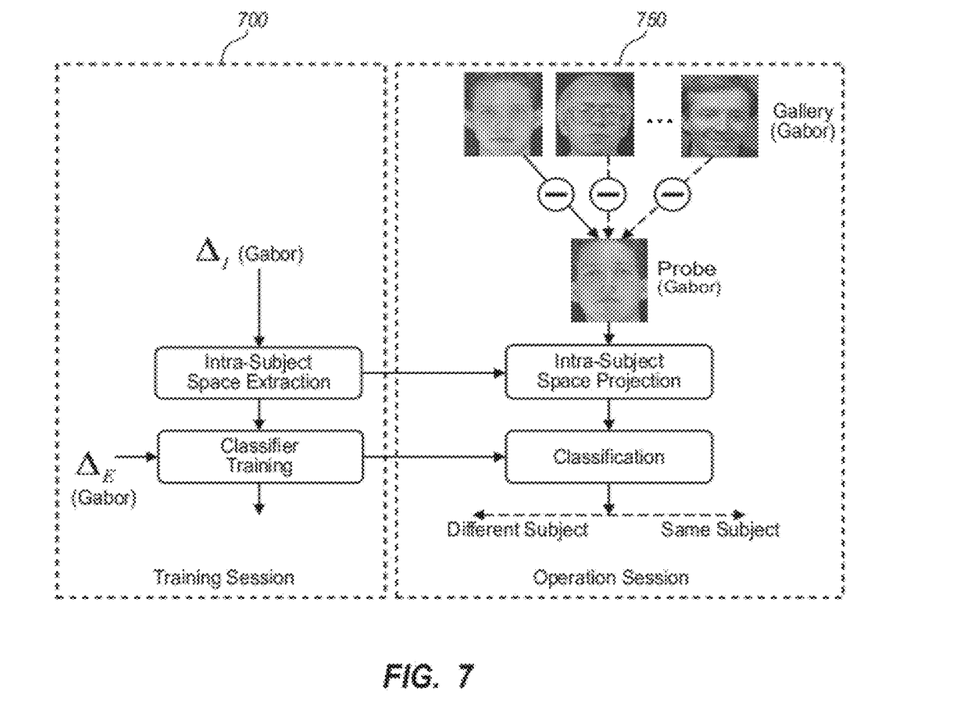
FIG. 7 is a flowchart of a Bayesian feature extraction process and a classification process of the example implementation of FIG. 3.

With reference now to FIG. 7, the training process 700 and operation process 750 under the Bayesian framework discussed above are disclosed. In the training process 700, a set of difference images (represented as Gabor vectors) are collected to extract intra-subject subspace and train the classifier. In the operation process 750, the image difference vector between the probe image and each gallery image is projected to the extracted intra-subject subspace followed by a classification procedure. The output is a confidence value indicating the probability of an image difference vector belonging to intra-subject class. Thus the identity of the probe belongs to the gallery image that results in the highest confidence value as long as the highest confidence value is above a predetermined threshold. If the highest confidence value does not exceed the predetermined threshold, then the probe is determined to belong to a subject that is not in the gallery.

In the reduced intra-subject space, a linear SVM classifier is applied to further separate the intra-subject and inter-subject samples. To further improve the generalization performance of the system, a different intra-subject and inter-subject sample set may be collected to train the SVM classifier.

For example, $Z=\{\hat{\delta}_i, y_i\}_{i=1}^N$ may be the training set containing N samples, each of which is associated with a class label $y_i \in \{-1, +1\}$, where "$-1$" denotes inter-subject class $\omega_E$ and "$+1$" denotes intra-subject class $\omega_I$. Each sample $\hat{\delta}_i = [\delta_1^i, \delta_2^i, \dots, \delta_M^i]^T$ is represented by an M-dimensional column vector in the intra-subject space, with $\hat{\delta}_i = A^T \delta_i$, $\delta_i = z_m - z_n$, where A is the transformation matrix obtained from the above acts. It can be observed that the distributions of both positive (intra-subject) and negative (inter-subject) samples are of zero mean. This is due to the fact that for a difference pair $(z_m - z_n)$, there exists $(z_n - z_m)$. This indicates that intra-subject class and inter-subject class are not linearly separable. One solution to the problem of not being linearly separable is to apply a nonlinear classifier, such as an SVM classifier with a Gaussian kernel. However, the computational cost is high. In the example implementation 300, in order to make the low computational cost linear SVM classifier applicable, a square function is firstly applied to each component of $\hat{\delta}_i$, such as $[(\hat{\delta}_1^i)^2, \dots, (\hat{\delta}_M^i)^2]^T$, to represent image difference in the intra-subject subspace. This makes $(z_m - z_n)$ and $(z_n - z_m)$ have the same feature representation. The training set is thus represented as $Z = \{\tilde{\delta}_i, y_i\}_{i=1}^N$, where $\tilde{\delta}_i = [\tilde{\delta}_1^i, \dots, \tilde{\delta}_M^i]^T = [(\hat{\delta}_1^i)^2, \dots, (\hat{\delta}_M^i)^2]^T$.

A linear SVM classifier seeks the best hyperplane ($w^T x + b = 0$) which can separate positive and negative samples, where w is normal to the hyperplane, $|b|/\|w\|$ is the perpendicular distance from the hyperplane to the origin, and $\|w\|$ is the Euclidean norm of w. Thus, an unknown sample $\tilde{\delta}$ will be classified to the positive (intra-subject) class if $w^T \tilde{\delta} + b \geq 0$ or the negative (inter-subject) class if $w^T \tilde{\delta} + b \leq 0$. Where $w = [w_1, w_2, \dots, w_M]^T$ is viewed as a weight vector, the above classification rule can be interpreted as follows. For any sample represented as $\tilde{\delta} = [\tilde{\delta}_1, \tilde{\delta}_2, \dots, \tilde{\delta}_M]^T$, the weighted summation of all feature components, denoted as S, is firstly computed, with $$S = w^T \tilde{\delta} = \sum_{j=1}^M w_j \tilde{\delta}_j.$$

The calculated value is then compared with a threshold (such as $-b$), if S is larger than the threshold, the corresponding sample is classified to the positive class. If S is not larger than the threshold, the corresponding sample is classified to the negative class. The weighted summation value $$S = \sum_{j=1}^M w_j \tilde{\delta}_j$$

can be viewed as the confidence of the classification decision. Then the key problem is to find the M+1 parameters $w = [w_1, w_2, \dots, w_M]^T$ and b which can be obtained through a traditional SVM training process.

It was shown in statistical learning theory that the required training sample size to achieve a pre-defined learning accuracy depends exponentially on the dimensionality of the sample space which is the dimensionality of the intra-subject (M) in this work. This indicates a large number of training samples is expected with a moderate M value (e.g., in this work, M=492). However, in realistic applications, available training samples are always limited. The lack of training samples versus the high dimensionality of the sample space leads to an overfitting problem resulting in low generalization performance. In order to improve the generalization ability of the system, the example implementation 300 employs a regularization strategy to reduce the estimation variance.

Figure 8:
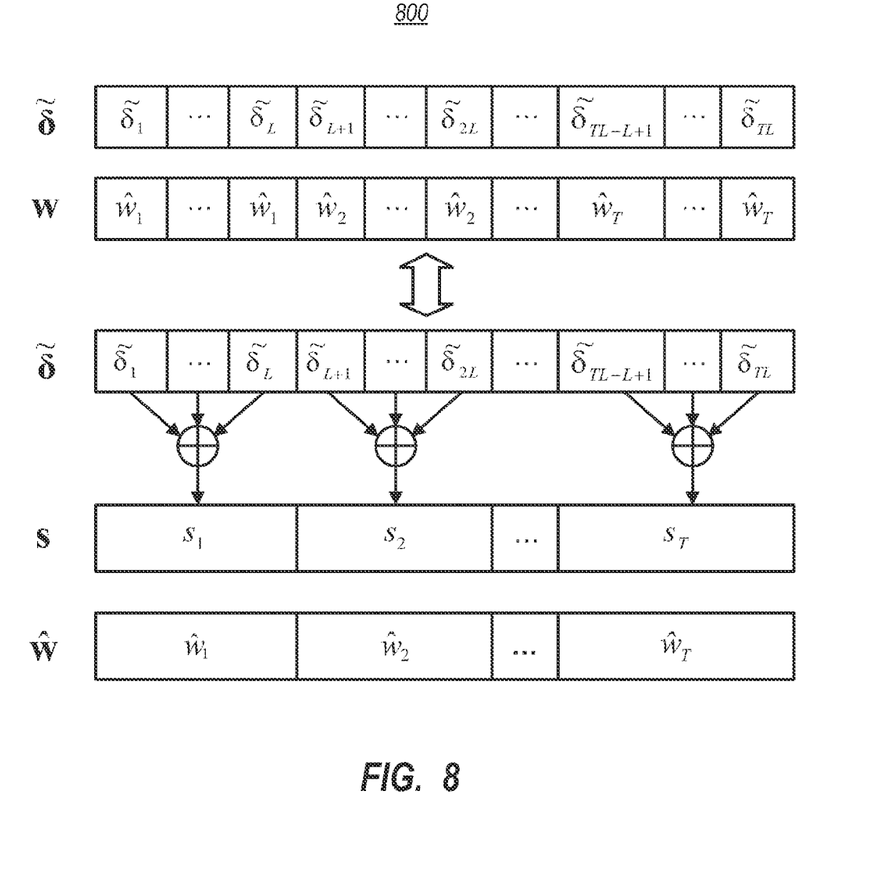
FIG. 8 is a flowchart of the construction of a regularized weight vector.

Instead of estimating M different weights for each feature component, only $T<M$ weights are estimated each of which is shared by L feature components, such that M=LT. With $w = [[\hat{w}_1, \dots, \hat{w}_1], [\hat{w}_2, \dots, \hat{w}_2], \dots, [\hat{w}_T, \dots, \hat{w}_T]]^T$ denoting a regularized weight vector, in order to calculate the weighted summation value of an input $\tilde{\delta} = [\tilde{\delta}_1, \tilde{\delta}_2, \dots, \tilde{\delta}_M]^T$, M components are firstly partitioned into T groups sequentially with each group containing L components, with $\tilde{\delta} = [[\tilde{\delta}_1, \dots, \tilde{\delta}_L], [\tilde{\delta}_{L+1}, \dots, \tilde{\delta}_{2L}], \dots, [\tilde{\delta}_{(T-1)L+1}, \dots, \tilde{\delta}_{TL}]]^T$. The weighted summation value S thus can be obtained according to the following equation:

$$\begin{aligned} S &= \sum_{j=1}^M w_j \tilde{\delta}_j \\ &= \sum_{m=1}^T \sum_{n=1}^L \hat{w}_m \tilde{\delta}_{(m-1)L+n} \\ &= \sum_{m=1}^T \hat{w}_m \left( \sum_{n=1}^L \tilde{\delta}_{(m-1)L+n} \right) \\ &= \sum_{m=1}^T \hat{w}_m s_m \\ &= \hat{w}^T s \end{aligned} \quad (5)$$

where $$s_m = \sum_{n=1}^{L} \tilde{\delta}_{(m-1)L+n},$$

$$\hat{w} = [\hat{w}_1, \ldots, \hat{w}_T]^T,$$

and $s=[s_1, \ldots, s_T]^T$. It can be seen from Equation (5) that optimizing a M-dimensional regularized weight vector $w=[[\hat{w}_1,\ldots,\hat{w}_1],[\hat{w}_2,\ldots,\hat{w}_2],\ldots,[\hat{w}_T,\ldots,\hat{w}_T]]^T$ is equivalent to optimizing a T dimensional weight vector $\hat{w}=[\hat{w}_1,\ldots,\hat{w}_T]$ by using training samples each of which is represented as a new feature vector $s=[s_1,\ldots,s_T]^T$. FIG. 8 discloses a process 800 for the construction of the regularized weight vector. In the example implementation 300, $\hat{w}$ is a weighting vector of size 1×100 which is obtained by training an SVM classifier on a collection of new feature vectors $s_i$ from a training database.

After obtaining a normal to a separation hyperplane $\hat{w}=[\hat{w}_1,\ldots,\hat{w}_T]$ through SVM training, for any probe image, the determination of its identity can be summarized as follows:

(1) Normalize G gallery images and calculate the corresponding Gabor feature vectors, denoted as $g_i$, i=1, ..., G;

(2) Normalize probe image and calculate the corresponding Gabor feature vector, denoted as p;

(3) For each $g_i$, i=1, ..., G, do
   (3.1) Calculate $\delta=p-g_i$;
   (3.2) Project $\delta=p-g_i$ to intra-subject space, obtaining $\hat{\delta}=A^T\delta$;
   (3.3) Apply square function to obtain $\tilde{\delta}$;
   (3.4) Calculate weighted summation $S_i$ according to Equation (5);

(4) The face recognition result can be obtained by applying the following rules:
if max($S_i$)<Threshold,
   The test face is from a new subject, belonging to none of the subjects in the gallery;
else
   The test face belongs to the gallery subject with the highest $S_i$ value.

Figure 9:
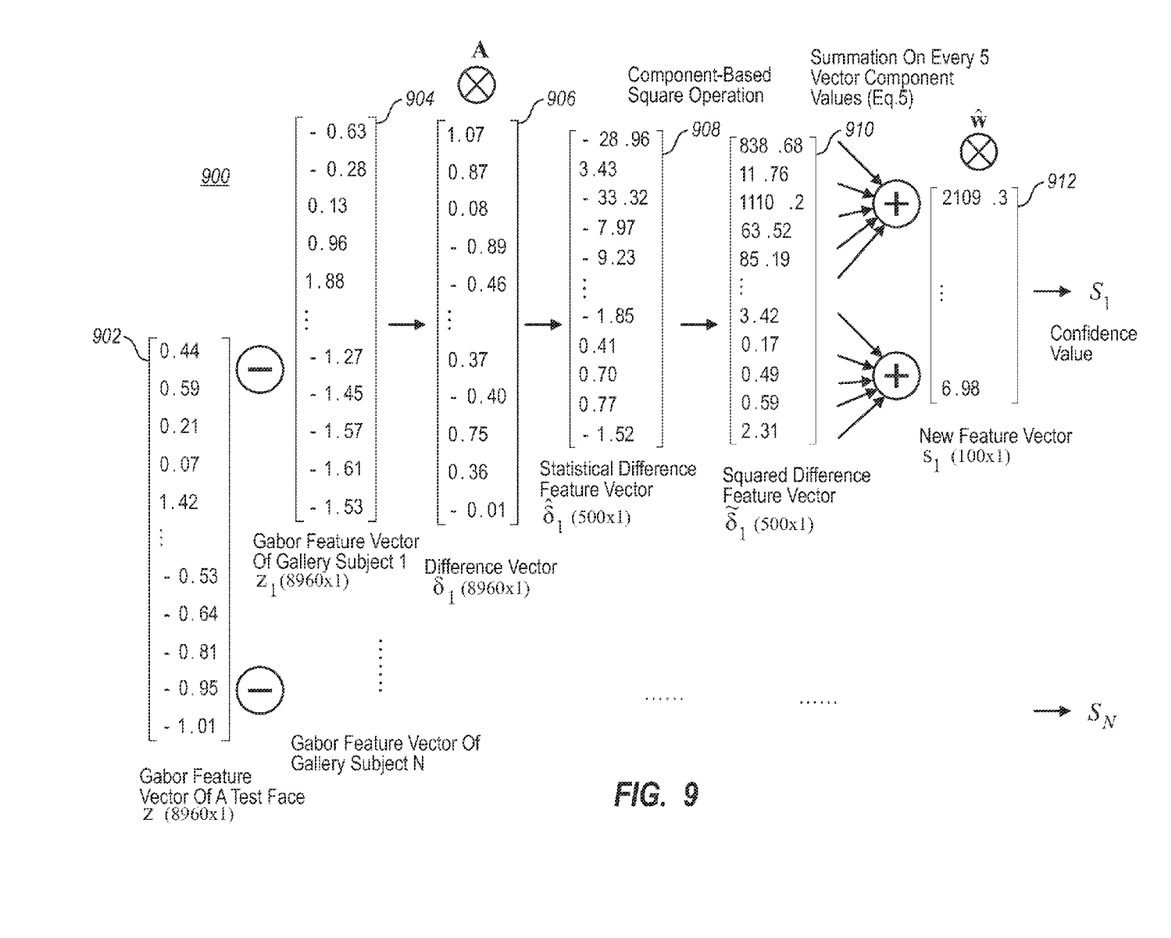
FIG. 9 is a flowchart of an example classification process of the example implementation of FIG. 3.

An example classification process 900 is depicted in FIG. 9. It is understood that the data values depicted in FIG. 9 are for example purposes only, and the example embodiments disclosed herein are not limited to these example data values. The classification process 900 begins with a Gabor feature vector 902 of a test face z of length (8960×1). The Gabor feature vector 902 is combined with a Gabor feature vector 904 of a first gallery subject $z_1$ of length (8960×1). A difference vector $S_1$ 906 of length (8960×1) is next generated. A statistical difference feature vector $\hat{\delta}$ 908 of length (500×1) is next calculated. Then, a squared difference feature vector $\tilde{\delta}$ 910 of length (500×1) is generated. Next, a new feature vector $s_1$ 912 of length (100×1) is calculated. Finally, a confidence value $S_i$ is output. This process 900 is then repeated for each N normalized gallery image feature vector in the gallery of images.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for automatic face recognition, the method comprising the following acts:
   i) detecting a face pattern in a probe digital image;
   ii) detecting two eye patterns in the detected face pattern;
   iii) normalizing the face pattern by rotating and resizing the face pattern to place centers of the two eye patterns on predetermined pixels;
   iv) transforming the normalized face pattern into a normalized face feature vector of Gabor feature representations;
   v) calculating a difference image vector using the normalized face feature vector and a normalized gallery image feature vector of a gallery image in a gallery of images;
   vi) projecting the difference image vector to a lower-dimensional intra-subject subspace extracted from a pre-collected training face database;
   vii) applying a square function to each component of the projection;
   viii) calculating a weighted summation of the squared projection;
   ix) repeating acts v)-viii) for each normalized gallery image feature vector in the gallery of images; and
   x) classifying the face pattern in the probe digital image as belonging to the gallery image with the highest calculated weighted summation where the highest calculated weighted summation is above a predefined threshold.

2. The method as recited in claim 1, wherein the act iii) further comprises applying a mask to the face pattern to remove non-face portions.

3. The method as recited in claim 2, wherein the act iii) further comprises performing histogram equalization on the masked face pattern.

4. The method as recited in claim 1, wherein the act iv) comprises transforming the normalized face pattern I(x) into a normalized face feature vector of Gabor feature representations $G_{u,v}(x)$, where each Gabor feature representation $G_{u,v}(x)$ is obtained according to the following equation:

$$G_{u,v}(x)=(I*\phi_{u,v})(x)$$

where:
x=[x, y] denotes the x- and y-coordinates of pixels of the normalized face pattern I(x); and
$\phi_{u,v}$ is a Gabor wavelet filter defined as follows:

$$\varphi_{u,v}(x) = \frac{\|k_{uv}\|^2}{\omega^2}\exp\left(\frac{-\|k_{uv}\|^2\|x\|^2}{2\omega^2}\right)\left[\exp(ik_{uv}x) - \exp\left(-\frac{\omega^2}{2}\right)\right]$$

where:
u, v define the orientations and scales of a Gabor wavelet kernel k;
$\omega$ is a sigma of a Gaussian envelope;
$\|.\|$ denotes a norm operator; and
$k_{uv}$ is defined as $$k_{uv} = \frac{k_{max}}{f}\exp\left(\frac{i\pi u}{8}\right)$$

where $k_{max}$ is a maximum frequency and f is a spacing factor between kernels in a frequency domain.

5. The method as recited in claim 4, wherein:

$$k_{max} = \frac{\pi}{2};$$
$$f = \sqrt{2};$$
$$\omega = 2\pi;$$
$$u = \{0, \ldots, 7\}; \text{ and}$$
$$v = \{0, \ldots, 4\}.$$

6. The method as recited in claim 1, wherein the act vi) comprises projecting the difference image vector $\delta_i$ to a lower-dimensional intra-subject subspace extracted from a pre-collected training face database resulting in a projection $\hat{\delta}$ that is calculated according to the following formula:

$$\hat{\delta}_i = A^T \delta_i$$

where $A^T$ is a transformation matrix.

7. The method as recited in claim 6, wherein the act vii) comprises applying a square function to each component of the projection resulting in the squared projection $\tilde{\delta}_i$ that is calculated according to the following formula:

$$\tilde{\delta}_i = [\tilde{\delta}_1^i, \ldots, \tilde{\delta}_M^i]^T = [(\hat{\delta}_1^i)^2, \ldots, (\hat{\delta}_M^i)^2]^T$$

where M components are firstly partitioned into T groups sequentially with each group containing L components.

8. The method as recited in claim 7, wherein the act viii) comprises calculating the weighted summation S of the squared projection $\tilde{\delta}_i$ according to the following formulas:

$$S = \sum_{j=1}^{M} w_j \tilde{\delta}_j$$
$$= \sum_{m=1}^{T} \sum_{n=1}^{L} \hat{w}_m \tilde{\delta}_{(m-1)L+n}$$
$$= \sum_{m=1}^{T} \hat{w}_m \left( \sum_{n=1}^{L} \tilde{\delta}_{(m-1)L+n} \right)$$
$$= \sum_{m=1}^{T} \hat{w}_m s_m$$
$$= \hat{w}^T s$$

where:

$$s_m = \sum_{n=1}^{L} \tilde{\delta}_{(m-1)L+n};$$
$$\hat{w} = [\hat{w}_1, \ldots, \hat{w}_T]^T;$$
$$s = [s_1, \ldots, s_T]^T; \text{ and}$$
$$w = [[\hat{w}_1, \ldots, \hat{w}_1], [\hat{w}_2, \ldots, \hat{w}_2], \ldots, [\hat{w}_T, \ldots, \hat{w}_T]]^T$$

denotes a regularized weight vector.

9. A method for automatic face recognition, the method comprising the following acts:
   i) obtaining a normal to a separation hyperplane $\hat{w} = [\hat{w}_1, \ldots, \hat{w}_T]$ through SVM training;
   ii) normalizing G gallery images and transforming the normalized G gallery images into corresponding Gabor feature vectors, denoted as $g_i$, $i = 1, \ldots, G$;
   iii) normalizing a probe image and transforming the normalized probe image into a corresponding Gabor feature vector, denoted as p;
   iv) calculating an image difference vector $\delta$, denoted as $\delta = p - g_i$;
   v) projecting the image difference vector $\delta$ to intra-subject space $A^T$, thereby obtaining a projection $\hat{\delta} = A^T \delta$;
   vi) applying a square function to the projection $\hat{\delta}$ to obtain $\tilde{\delta}$;
   vii) M components of $\tilde{\delta}$ are firstly partitioned into T groups sequentially with each group containing L components with $\tilde{\delta} = [[\tilde{\delta}_1, \ldots, \tilde{\delta}_L], [\tilde{\delta}_{L+1}, \ldots, \tilde{\delta}_{2L}], \ldots, [\tilde{\delta}_{(T-1)L+1}, \ldots, \tilde{\delta}_{TL}]]^T$;
   viii) calculating a weighted summation $S_i$ according to the following equation:

$$S = \sum_{j=1}^{M} w_j \tilde{\delta}_j$$
$$= \sum_{m=1}^{T} \sum_{n=1}^{L} \hat{w}_m \tilde{\delta}_{(m-1)L+n}$$
$$= \sum_{m=1}^{T} \hat{w}_m \left( \sum_{n=1}^{L} \tilde{\delta}_{(m-1)L+n} \right)$$
$$= \sum_{m=1}^{T} \hat{w}_m s_m$$
$$= \hat{w}^T s;$$

ix) for each $g_i$, repeating acts iv)-viii); and
   x) determining that the probe image belongs to the gallery subject associated with the highest $S_i$ value where the highest $S_i$ value is above a predefined threshold,
   where:

$$s_m = \sum_{n=1}^{L} \tilde{\delta}_{(m-1)L+n};$$
$$\hat{w} = [\hat{w}_1, \ldots, \hat{w}_T]^T;$$
$$s = [s_1, \ldots, s_T]^T;$$
$$w = [[\hat{w}_1, \ldots, \hat{w}_1], [\hat{w}_2, \ldots, \hat{w}_2], \ldots, [\hat{w}_T, \ldots, \hat{w}_T]]^T$$

denotes a regularized weight vector.

10. The method as recited in claim 9, wherein the act vi) comprises applying a square function to obtain $\tilde{\delta}$ according to the following equation:

$$\tilde{\delta}_i = [\tilde{\delta}_1^i, \ldots, \tilde{\delta}_M^i]^T = [(\hat{\delta}_1^i)^2, \ldots, (\hat{\delta}_M^i)^2]^T.$$

11. The method as recited in claim 9, wherein the normalizing acts ii) and iii) each comprise:
   detecting a face pattern in the respective image;
   detecting two eye patterns in the detected face pattern;
   rotating and resizing the face pattern to place centers of the two eye patterns on predetermined pixels;
   applying a mask to the face pattern to remove non-face portions; and
   performing histogram equalization on the masked face pattern.

12. One or more non-transitory computer-readable media having computer-readable instructions thereon which, when executed by a programmable processor, implement a method for automatic face recognition, the method comprising the acts of:
   i) detecting a face pattern in a probe digital image;
   ii) detecting two eye patterns in the detected face pattern;

iii) normalizing the face pattern by rotating and resizing the face pattern to place centers of the two eye patterns on predetermined pixels;
iv) transforming the normalized face pattern into a normalized face feature vector of Gabor feature representations;
v) calculating a difference image vector using the normalized face feature vector and a normalized gallery image feature vector of a gallery image in a gallery of images;
vi) projecting the difference image vector to a lower-dimensional intra-subject subspace extracted from a pre-collected training face database;
vii) applying a square function to each component of the projection;
viii) calculating a weighted summation of the squared projection;
ix) repeating acts v)-viii) for each normalized gallery image feature vector in the gallery of images; and
x) classifying the face pattern in the probe digital image as belonging to the gallery image with the highest calculated weighted summation where the highest calculated weighted summation is above a predefined threshold.

13. The one or more non-transitory computer-readable media as recited in claim 12, wherein the act iii) further comprises applying a mask to the face pattern to remove non-face portions and performing histogram equalization on the masked face pattern.

14. The one or more non-transitory computer-readable media as recited in claim 12, wherein the act iv) comprises transforming the normalized face pattern I(x) into a normalized face feature vector of Gabor feature representations $G_{uv}$(x), where each Gabor feature representation $G_{uv}$(x) is obtained according to the following equation:

$$G_{uv}(x) = (I * \phi_{uv})(x)$$

where:
x=[x,y] denotes the x- and y-coordinates of pixels of the normalized face pattern I(x);
$\phi_{u,v}$ is a Gabor wavelet filter defined as follows:

$$\varphi_{u,v}(x) = \frac{\|k_{uv}\|^2}{\omega^2} \exp\left(\frac{-\|k_{uv}\|^2 \|x\|^2}{2\omega^2}\right) \left[\exp(ik_{uv}x) - \exp\left(-\frac{\omega^2}{2}\right)\right]$$

where:
u, v define the orientations and scales of a Gabor wavelet kernel k;
ω is a sigma of a Gaussian envelope;
$\|.\|$ denotes the norm operator; and
$k_{uv}$ is defined as $$k_{uv} = \frac{k_{max}}{f} \exp\left(\frac{i\pi u}{8}\right)$$

where $k_{max}$ is a maximum frequency and f is a spacing factor between kernels in a frequency domain.

15. The one or more non-transitory computer-readable media as recited in claim 14, wherein:

$$k_{max} = \frac{\pi}{2};$$
$$f = \sqrt{2};$$

$$\omega = 2\pi;$$
$$u = \{0, \ldots, 7\}; \text{ and}$$
$$v = \{0, \ldots, 4\}.$$

16. The one or more non-transitory computer-readable media as recited in claim 12, wherein the act vi) comprises projecting the difference image vector $\delta_i$ to a lower-dimensional intra-subject subspace extracted from a pre-collected training face database resulting in a projection $\hat{\delta}$ that is calculated according to the following formula:

$$\hat{\delta}_i = A^T \delta_i$$

where $A^T$ is defined as a transformation matrix.

17. The one or more non-transitory computer-readable media as recited in claim 16, wherein the act vii) comprises applying a square function to each component of the projection resulting in the squared projection $\tilde{\delta}_i$ that is calculated according to the following formula:

$$\tilde{\delta}_i = [\tilde{\delta}_1{}^i, \ldots, \tilde{\delta}_M{}^i]^T = [(\hat{\delta}_1{}^i)^2, \ldots, (\hat{\delta}_M{}^i)^2]^T$$

where M components are firstly partitioned into T groups sequentially with each group containing L components.

18. The one or more non-transitory computer-readable media as recited in claim 17, wherein the act viii) comprises calculating the weighted summation S of the squared projection $\tilde{\delta}_i$ according to the following formulas:

$$S = \sum_{j=1}^{M} w_j \tilde{\delta}_j$$
$$= \sum_{m=1}^{T} \sum_{n=1}^{L} \hat{w}_m \tilde{\delta}_{(m-1)L+n}$$
$$= \sum_{m=1}^{T} \hat{w}_m \left(\sum_{n=1}^{L} \tilde{\delta}_{(m-1)L+n}\right)$$
$$= \sum_{m=1}^{T} \hat{w}_m s_m$$
$$= \hat{w}^T s$$

where:

$$s_m = \sum_{n=1}^{L} \tilde{\delta}_{(m-1)L+n};$$
$$\hat{w} = [\hat{w}_1, \ldots, \hat{w}_T]^T;$$
$$s = [s_1, \ldots, s_T]^T;$$
$$w = [[\hat{w}_1, \ldots, \hat{w}_1], [\hat{w}_2, \ldots, \hat{w}_2], \ldots, [\hat{w}_T, \ldots, \hat{w}_T]]^T$$

denotes a regularized weight vector.

19. An image processing apparatus comprising:
an electronic display; and
a processor in electronic communication with the electronic display; and
one or more computer-readable media in electronic communication with the processor, the one or more computer-readable media having computer-readable instructions thereon which, when executed by the processor, cause the processor to:
i) detect a face pattern in a probe digital image;
ii) detect two eye patterns in the detected face pattern;

iii) normalize the face pattern by rotating and resizing the face pattern to place centers of the two eye patterns on predetermined pixels;
iv) transform the normalized face pattern into a normalized face feature vector of Gabor feature representations;
v) calculate a difference image vector using the normalized face feature vector and a normalized gallery image feature vector of a gallery image in a gallery of images;
vi) project the difference image vector to a lower-dimensional intra-subject subspace extracted from a pre-collected training face database;
vii) apply a square function to each component of the projection;
viii) calculate a weighted summation of the squared projection;
ix) repeat acts v)-viii) for each normalized gallery image feature vector in the gallery of images;
x) classify the face pattern in the probe digital image as belonging to the gallery image with the highest calculated weighted summation where the highest calculated weighted summation is above a predefined threshold; and
xi) send data corresponding to the gallery image to which the probe digital image belongs to the electronic display for display thereon.

20. The image processing apparatus as recited in claim 19, wherein:
the image processing apparatus comprises a photo viewer;
the one or more computer-readable media comprises one or more of a RAM, a ROM, and a flash EEPROM; and
the electronic visual display comprises a liquid crystal display.

* * * * *